United States Patent
Coburn

(10) Patent No.: US 6,994,293 B1
(45) Date of Patent: Feb. 7, 2006

(54) TAPE DRIVE TRANSPORT ROLLER

(75) Inventor: Peter R. Coburn, LaFayette, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 10/844,842

(22) Filed: May 13, 2004

(51) Int. Cl.
*B65H 57/14* (2006.01)
*G03B 1/46* (2006.01)

(52) U.S. Cl. .............................. 242/615.2; 242/615.4; 242/346.2

(58) Field of Classification Search ............. 242/615.2, 242/615.4, 346, 397, 397.5, 548, 346.2
See application file for complete search history.

(56) References Cited

U.S. PATENT DOCUMENTS

| | | | | |
|---|---|---|---|---|
| 3,405,855 A | * | 10/1968 | Daly et al. | 242/615.4 |
| 3,405,884 A | * | 10/1968 | Patterson, Jr. | 242/615.2 |
| 4,390,119 A | * | 6/1983 | Smetana et al. | 242/615.4 |
| 4,566,162 A | * | 1/1986 | Brands | 242/548 |
| 4,633,347 A | * | 12/1986 | Higgins | 242/615.4 |
| 5,088,172 A | | 2/1992 | Daly | |
| 5,199,168 A | | 4/1993 | Daly | |
| 6,508,750 B1 | * | 1/2003 | Poorman | |
| 6,754,033 B1 | * | 6/2004 | Argumedo et al. | |
| 2004/0222327 A1 | * | 11/2004 | Hanscom | 242/615.2 |

FOREIGN PATENT DOCUMENTS

JP           3-250480     * 11/1991

\* cited by examiner

*Primary Examiner*—William A. Rivera
(74) *Attorney, Agent, or Firm*—Brooks Kushman P.C.

(57) ABSTRACT

A tape transport roller for a tape drive includes a roller body having a longitudinal axis and first and second grooves that each run obliquely to the axis. The grooves are configured to vent air disposed between the roller body and magnetic tape traveling across the roller body.

15 Claims, 4 Drawing Sheets

TAPE DRIVE TRANSPORT ROLLER

BACKGROUND OF THE INVENTION

1. Field of the Invention

The invention relates to magnetic tape drive systems, and more particularly, to a roller for use in a tape drive system.

2. Background Art

A tape drive is used to perform read and/or write operations on magnetic tape supplied by a tape cartridge. Such a tape drive may be provided with one or more rollers for guiding movement of the tape along a tape path, which extends between a supply reel of the tape cartridge and a take-up reel of the tape drive. Drive motors typically associated with the reels, and driven under control of a motor controller circuit, are used to control speed of the tape along the tape path. A tachometer associated with one of the rollers may be used to monitor speed of the tape by monitoring speed of the roller, and to provide input signals to the motor controller circuit indicative of tape speed.

If the tape slips on the roller, however, the tachometer will not provide an accurate indication of tape speed. Such slippage may be attributed, in part, to a thin film of air that flows between the tape and the roller and lifts the tape off the roller.

A prior solution for venting such an air film is disclosed in U.S. Pat. No. 5,088,172. The roller disclosed in that patent includes a helical groove that extends between opposite ends of the roller. Such a groove, however, may induce lateral movement in tape traveling across the roller, thereby causing data read and/or write errors. Moreover, lateral tape movement may cause the tape to impinge on a flange of the roller, thereby causing increased tape edge loading and tape edge wear.

SUMMARY OF THE INVENTION

The above problems associated with the prior art may be addressed by the present invention.

Under the invention, a tape transport roller for a tape drive includes a roller body having a longitudinal axis and first and second grooves that each run obliquely to the axis. The grooves are configured to vent air disposed between the roller body and magnetic tape traveling across the roller body.

According to one aspect of the invention, at least a portion of the first groove may form a first angle with a plane that is perpendicular to the axis, and at least a portion of the second groove may form a second angle with the plane that is different than the first angle. With such a configuration, lateral tape movement may be reduced compared to the prior art.

Further under the invention, a tape drive is provided for receiving a tape cartridge having a length of magnetic tape. The tape drive includes a drive body and a roller supported by the drive body for guiding the magnetic tape. The roller includes a longitudinal axis and first and second helical grooves that each run obliquely to the axis. The grooves are configured to vent air disposed between the roller and the magnetic tape as the magnetic tape travels across the roller. The first groove forms a first angle with a plane that is perpendicular to the axis, and the second groove forms a second angle with the plane that is different than the first angle.

Still further under the invention, a tape transport roller for a tape drive includes a roller body having a longitudinal axis and a groove that is configured to vent air disposed between the roller body and magnetic tape traveling across the roller body. The groove has first and second portions that each run obliquely to the axis. The first portion forms a first angle with a plane perpendicular to the axis, and the second portion forms a second angle with the plane that is different than the first angle.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION OF THE PREFERRED EMBODIMENT(S)

Figure 1:
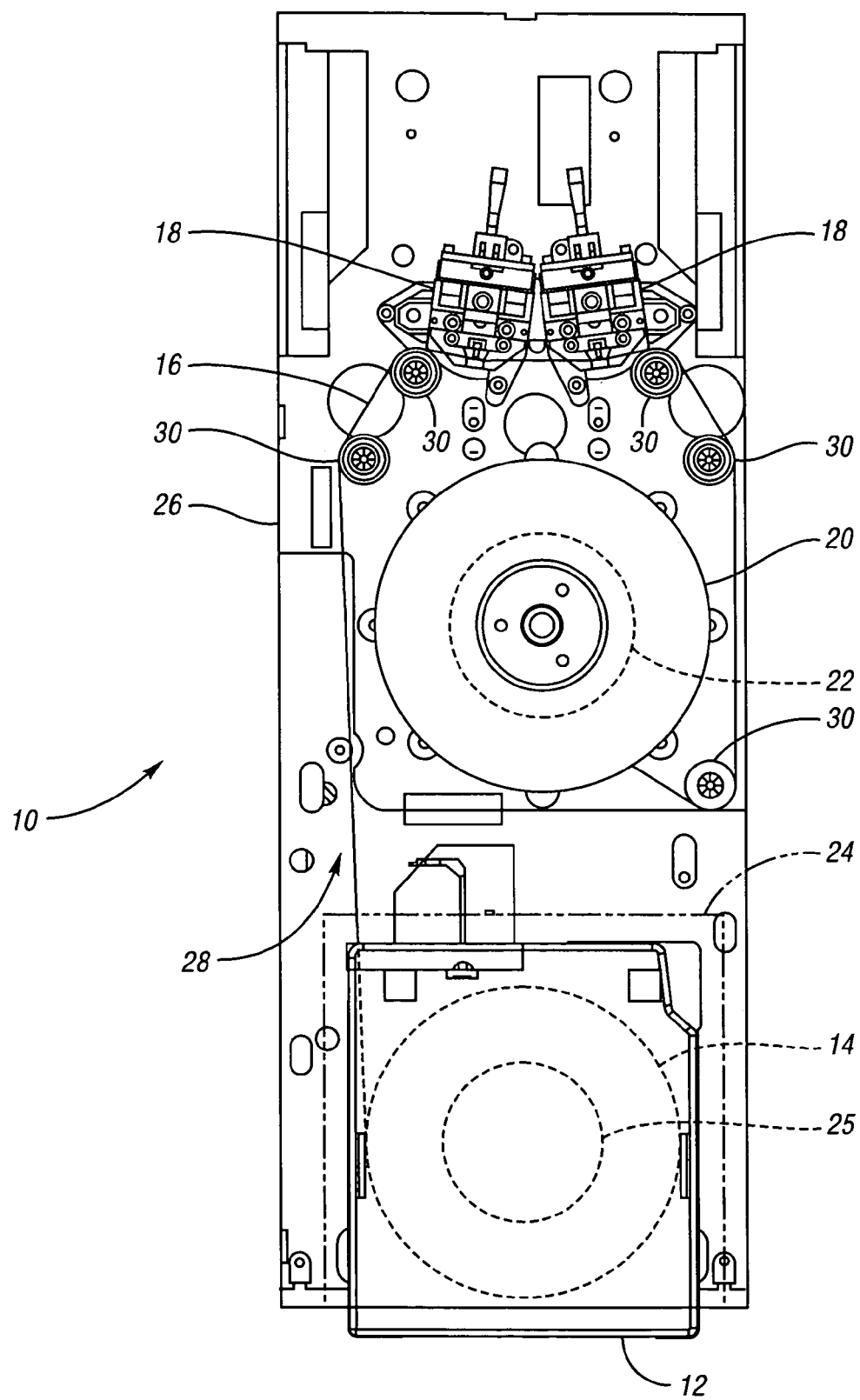
FIG. 1 is a plan view of a tape drive including multiple rollers for guiding movement of magnetic tape in the tape drive.

FIG. 1 shows a tape drive 10 according to the invention for use with a tape cartridge 12 having a supply reel 14 and a length of magnetic tape 16 wound on the supply reel 14. The tape drive 10 includes one or more magnetic heads 18 for performing read and/or write operations on the tape 16, a take-up reel 20 for receiving the tape 16, a motor 22 for driving the take-up reel 20, and a cartridge receiver 24 for receiving the tape cartridge 12. Furthermore, cartridge receiver 24 includes a motor 25 that is configured to drive the supply reel 14 of the tape cartridge 12. The components 18, 20, 22 and 24 are mounted in and supported by a drive body such as housing 26.

The tape drive 10 may also include a threading mechanism (not shown) for routing the tape 16 and an associated cartridge leader (not shown) along a tape path 28 to the take-up reel 20. The tape path 28 includes one or more guide members, such as tape transport rollers 30 rotatably supported on the drive body 26, for guiding movement of the tape 16 along the tape path 28. The rollers 30 also inhibit lateral (up and down) movement of the tape 16 as the tape 16 moves across media bearing faces of the heads 18. Moreover, one or more of the rollers 30 may also include a tachometer (not shown) for monitoring tape speed.

Figure 2:
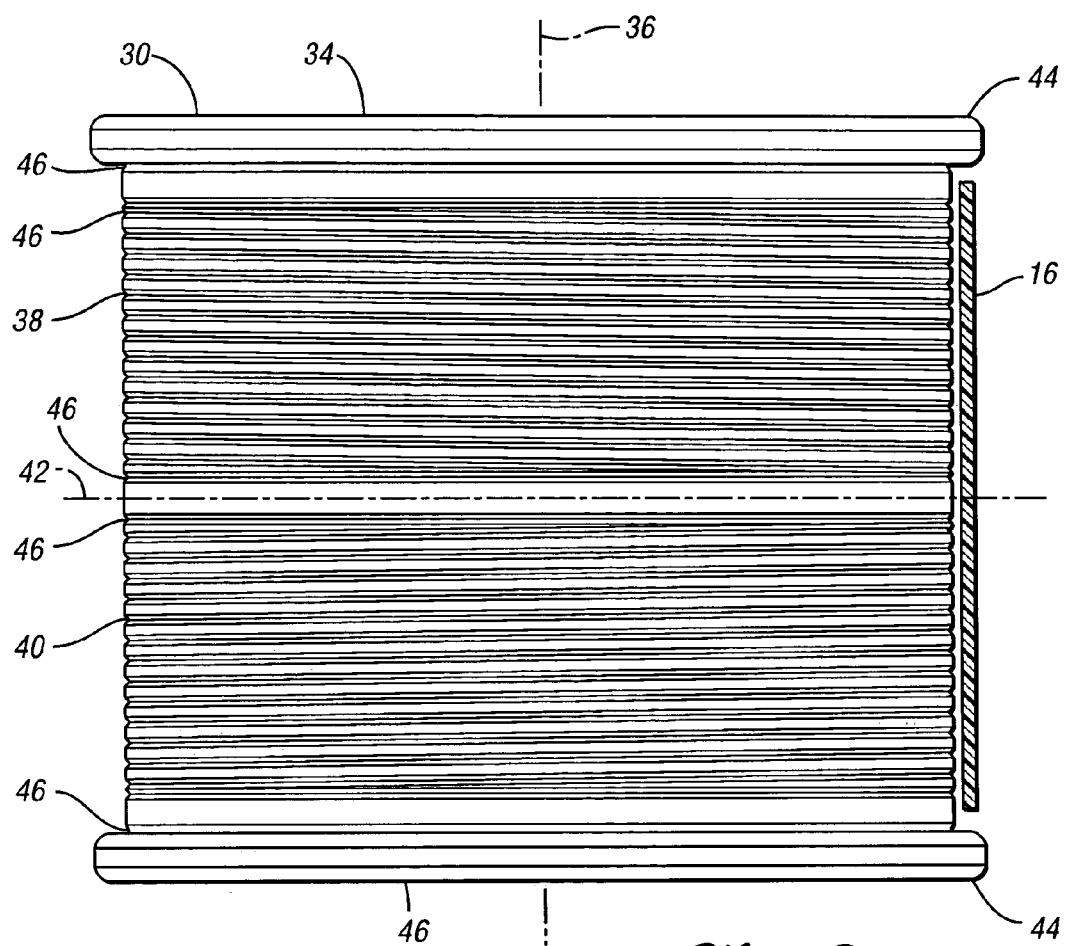
FIG. 2 is a side view of an exemplary embodiment of a roller according to the invention.
Figure 3:
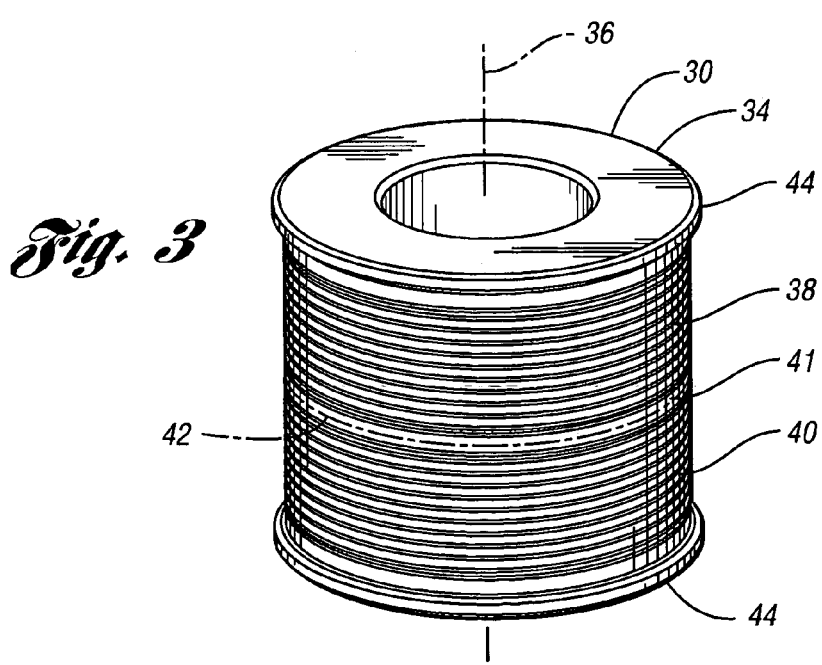
FIG. 3 is an isometric view of the roller of FIG. 2.

While each roller 30 may have any suitable configuration, an exemplary roller configuration is shown in FIGS. 2 and 3. In the embodiment shown in those Figures, the roller 30 includes a roller body 34 having a longitudinal axis 36, first and second grooves 38 and 40, respectively, that each run obliquely to the axis 36, and a generally smooth circumferential surface 41 disposed between the grooves 38 and 40. Although not required, the roller body 34 may also include one or more flanges 44.

The grooves 38 and 40 are configured to vent air captured between the roller body 34 and the tape 16 as the tape 16 travels across the roller body 34. As a result, the grooves 38 and 40 may reduce or eliminate slippage of the tape 16 relative to the roller body 34. While the grooves 38 and 40 may have any suitable configuration, in the embodiment shown in FIGS. 2 and 3, each groove 38 and 40 is a helical groove having a constant pitch such that each groove 38 and 40 forms a constant angle relative to a plane 42 (shown as a line in FIG. 2) that is perpendicular to the axis 36. For example, each groove 38 and 40 may have a pitch in the range of 0.01 to 0.02 inches (groove center to center). The grooves 38 and 40, however, are oriented differently. For example, the first groove 38 shown in FIGS. 2 and 3 is a left hand groove that forms a positive angle with the plane 42, and the second groove 40 is a right hand groove that forms a negative angle with the plane 42.

As another example, each groove 38 and 40 may be a spiral groove having a pitch that varies over the roller body 34. With such a configuration, the angle formed between each groove 38 and 40 and the plane 42 may vary. For example, the first groove 38 may define a positive angle with the plane 42 that varies between 0 and 90 degrees, and the second groove 40 may define a negative angle with respect to the plane 42 that varies between 0 and −90 degrees.

In the embodiment shown in FIGS. 2 and 3, the roller body 34 also includes multiple circumferential grooves 46 that each lie in a plane that is generally perpendicular to the axis 36. Furthermore, each groove 38 and 40 extends from one circumferential groove 46 to another circumferential groove 46.

Figure 4:
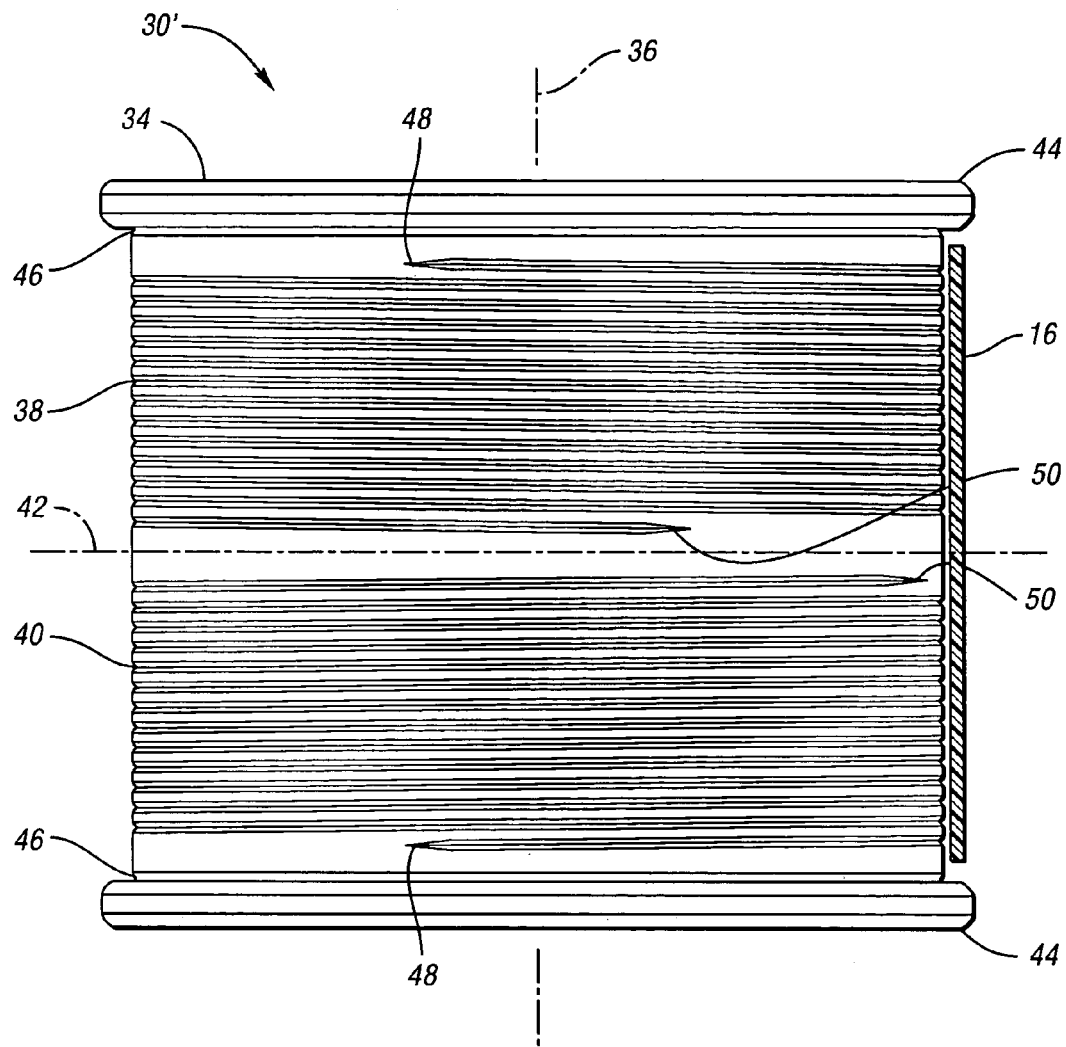
FIG. 4 is a side view of a second embodiment of the roller.

Alternatively, the grooves 38 and 40 may terminate away from any such circumferential grooves. In the embodiment 30' shown in FIG. 4, for example, each groove 38 and 40 has first and second opposite ends 48 and 50, respectively. Each first end 48 is disposed proximate an end, such as a flange 44, of the roller body 34, and each second end 50 is disposed proximate a central portion of the roller body 34.

Figure 5:
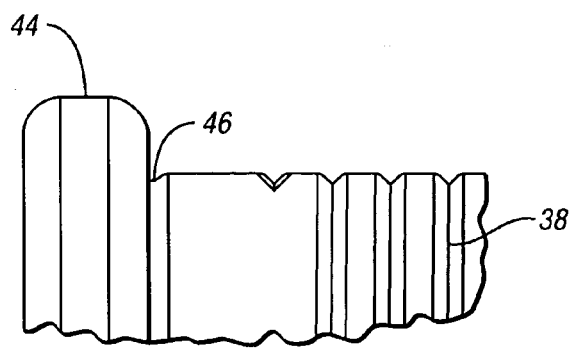
FIG. 5 is an enlarged portion of the roller of FIG. 4.

Moreover, each groove 38 and 40 may have any suitable shape and size. Referring to FIG. 5 for example, each groove 38 and 40 may have a generally triangular cross-section and a width in the range of 0.002 to 0.008 inches (although only the first groove 38 is shown in FIG. 5, the second groove 40 may be provided with the same or similar configuration). As another example, each groove 38 and 40 may have a generally round, generally square or rectangular cross-section. Furthermore, each groove 38 and 40 is preferably provided with smooth edges or radiuses at the interfaces of the grooves 38 and 40 with generally smooth circumferential surface portions of the roller body 34.

Because each roller 30, 30' may be provided with grooves 38 and 40 that are canted at different angles with respect to the plane 42, lateral movement of the tape 16 resulting from groove induced forces may be substantially reduced compared to a roller having a single groove canted at the same angle along the length of the roller. Furthermore, if the grooves 38 and 40 are generally mirror images of each other (i.e., if the grooves 38 and 40 are canted at generally equal and opposite angles with respect to the plane 42), the forces induced by the first groove 38 may be substantially cancelled out by the forces induced by the second groove 40 such that lateral tape movement may be substantially eliminated. The above benefits may also be realized even if the tape 16 does slip relative to the roller body 34 during, for example, high speed tape movements, such as tape turn around, tape rewind, etc.

Figure 6:
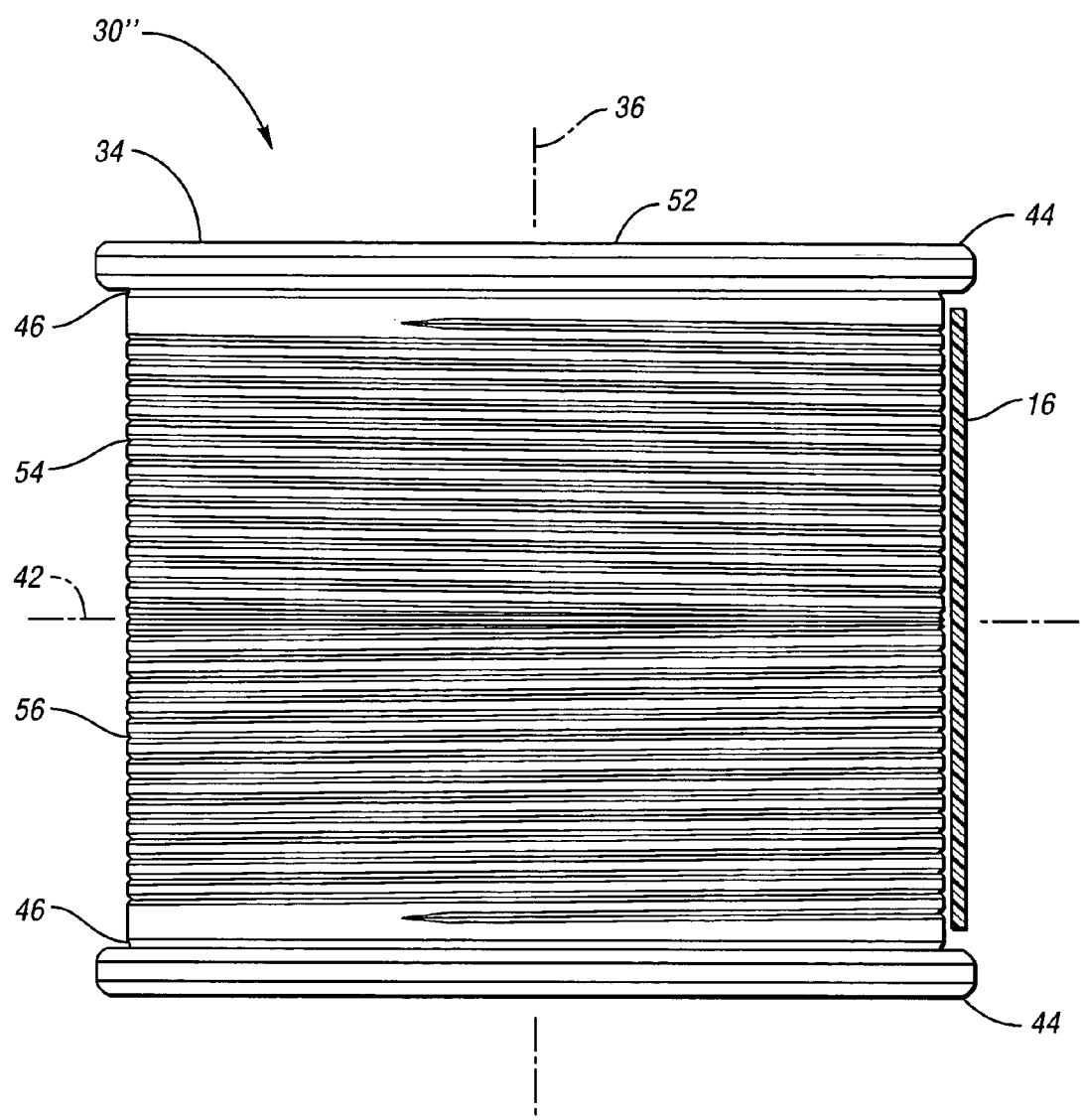
FIG. 6 is a side view of a third embodiment of the roller.

FIG. 6 shows another embodiment 30" of a roller according to the invention, which functions in a similar manner as described above in detail. The roller 30" is provided with a continuous groove 52 having first and second groove portions 54 and 56, respectively. The groove portions 54 and 56 run obliquely to axis 36, but are canted at different angles with respect to plane 42, which is perpendicular to axis 36. In the embodiment shown in FIG. 6, the first groove portion 54 forms a first angle with plane 42 between 0 and 90 degrees, and the second groove portion 56 forms a second angle with plane 42 between 0 and −90 degrees. Preferably, but not necessarily, the first and second angles are equal and opposite.

The above described rollers may be comprise any suitable material and may be made in any suitable manner. For example, the rollers may be made of metal, and the groove or grooves may be formed with a cutting tool while rotating the roller body on a lathe. For the embodiment shown in FIG. 6, the roller body may be rotated in a first direction to form the first groove portion 54, and then rotated in a second direction to form the second groove portion 56. Furthermore, a double sided cutting tool may be used to form the groove portions 54 and 56.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tape transport roller for a tape drive, the roller comprising:
   a roller body having a longitudinal axis and first and second grooves that each run obliquely to the axis, the grooves being configured to vent air disposed between the roller body and magnetic tape traveling across the roller body, wherein the roller body further includes a circumferential groove disposed between the first and second grooves.

2. The roller of claim 1 wherein at least a portion of the first groove forms a first angle with a plane that is perpendicular to the axis, and at least a portion of the second groove forms a second angle with the plane, the second angle being different than the first angle.

3. The roller of claim 1 wherein the roller body includes a generally smooth circumferential surface disposed between the first and second grooves.

4. The roller of claim 1 wherein the roller body includes three additional circumferential grooves, and each of the first and second grooves extends between two of the circumferential grooves.

5. The roller of claim 1 wherein the first groove comprises a first helical groove, and the second groove comprises a second helical groove.

6. The roller of claim 5 wherein the roller body further includes three additional circumferential grooves, and each helical groove extends between two circumferential grooves.

7. The roller of claim 1 wherein the roller body has first and second flange portions, and the first and second grooves are disposed between the flange portions.

8. The roller of claim 1 further comprising an additional circumferential groove disposed between the first and second grooves.

9. The roller of claim 8 wherein the circumferential grooves are spaced apart from each other.

10. A tape drive for receiving a tape cartridge having a length of magnetic tape, the tape drive comprising:
   a drive body; and
   a roller supported by the drive body for guiding the magnetic tape, the roller including a longitudinal axis and first and second helical grooves that each run obliquely to the axis, the grooves being configured to vent air disposed between the roller and the magnetic tape as the magnetic tape travels across the roller, the first groove forming a first angle with a plane that is perpendicular to the axis, the second groove forming a second angle with the plane, the second angle being different than the first angle, the roller further including a circumferential groove disposed between the first and second grooves.

11. The tape drive of claim 10 wherein the roller further comprises an additional circumferential groove disposed between the first and second helical grooves.

12. The tape drive of claim 11 wherein the circumferential grooves of the roller are spaced apart from each other.

13. A tape transport roller for a tape drive, the roller comprising:
a roller body having a longitudinal axis and a continuous groove that is configured to vent air disposed between the roller body and magnetic tape traveling across the roller body, the groove having first and second portions that each run obliquely to the axis, the first portion forming a first angle with a plane perpendicular to the axis, and the second portion forming a second angle with the plane, the second angle being different than the first angle.

14. The roller of claim 13 wherein the first portion comprises a first helical groove, and the second portion comprises a second helical groove.

15. The roller of claim 13 wherein the first angle is in the range of 1 to 30 degrees, and the second angle is in the range of −1 to −30 degrees.

* * * * *